July 1, 1930.  C. T. MYERS  1,769,069
MAGAZINE LUBRICATING MEANS
Filed Feb. 17, 1925
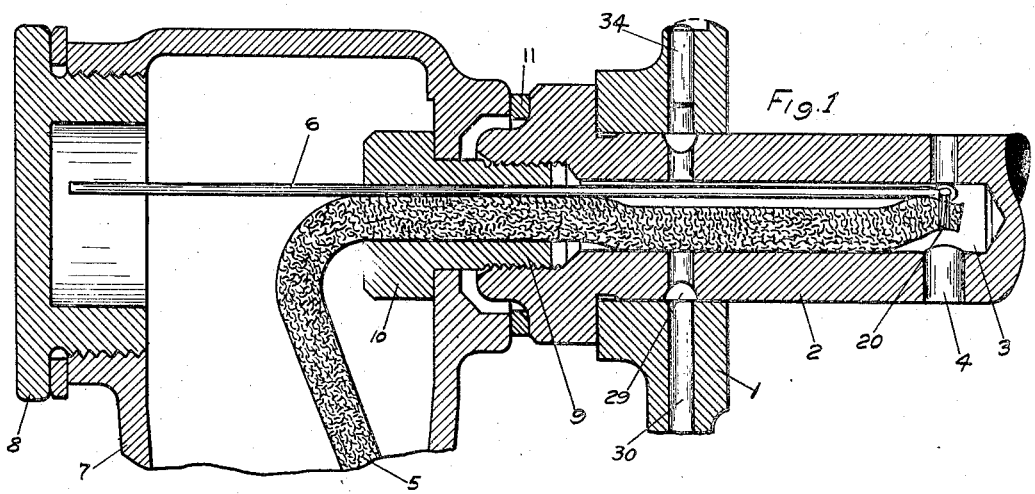
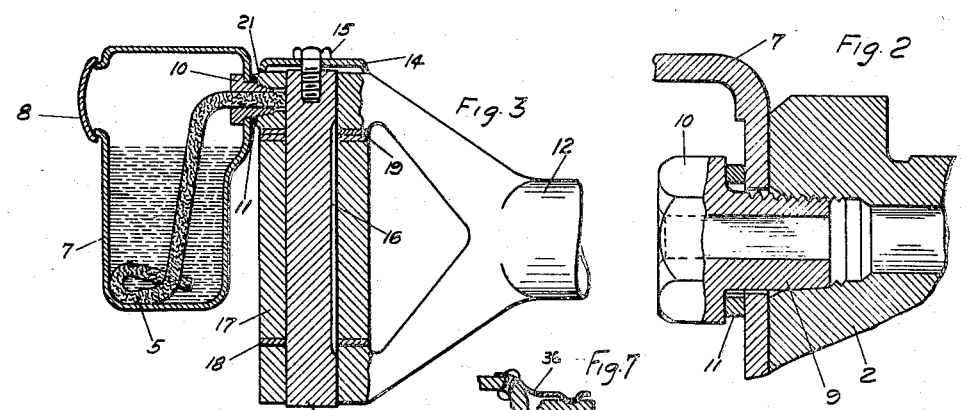
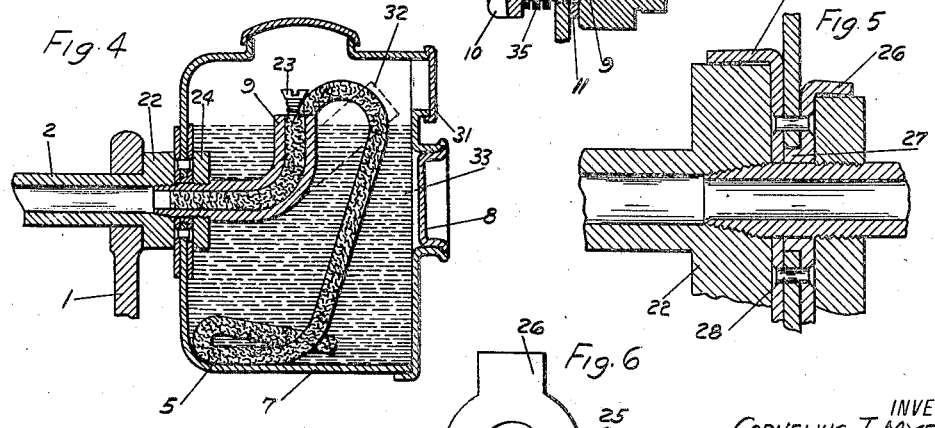
INVENTOR
CORNELIUS T. MYERS
BY
A. D. T. Libby
ATTORNEY Patented July 1, 1930

1,769,069

UNITED STATES PATENT OFFICE

CORNELIUS T. MYERS, OF AVENEL, NEW JERSEY

MAGAZINE-LUBRICATING MEANS

Application filed February 17, 1925. Serial No. 9,727.

This invention relates to means for oiling or lubricating bearings of different kinds, particularly those on automotive vehicles, on which, it has been the general practise in the past to lubricate with grease. It is hard to force grease into such bearings, as spring shackle bolts, steering pivots, tie-rod bearings etc. All such bearings are exposed to various elements which tend to work their way into these bearings causing the grease to harden and thus prevent lubrication. Furthermore, the presence of grit, and dirt in the bearings quickly wears them out, thereby producing rattles and other annoyances.

This present application is a continuation, in part, of my application 674,872, filed November 15, 1923, and it further includes improvements in ways and means for attaching the lubricant supply reservoir which is adapted to carry a large quantity of oil, to the various parts to be lubricated.

It is therefore, the principal object of this invention to provide simple, and readily attachable means for the lubricant reservoir so that the installation may be readily and quickly performed, and oil-fed to the bearings in just the right quantity to keep them in good working condition without a waste of lubricant.

Other objects will be apparent to one skilled in this art after a study of the specification taken in connection with the annexed drawing, in which Figure 1 is a partial sectional view of enlarged size showing the method of attaching the lubricant reservoir to the head of a spring bolt.

Figure 2 is a partial sectional view on a reduced scale of another form of attaching the reservoir to the head of a spring bolt.

Figure 3 shows the manner in which the oil reservoir may be attached to some other member such as a tie-rod yoke.

Figure 4 shows another method of attaching an individual reservoir to a spring bolt.

Figure 5 is an enlarged sectional detailed view of one means for locking the reservoir to the spring bolt shown in the construction in Fig. 4.

Figure 6 is a detail of the locking means shown in Fig. 5.

Figure 7 shows a detail of construction which may be used with the various other figures.

Figures 4, 5, and 6 are the same as Figs. 7, 8 and 9 in my co-pending case previously referred to, while Figs. 1, 2, and 3 illustrate modified forms of the means for clamping the magazine.

In the drawing the same numbers refer to corresponding parts in the various views; 1 illustrates a part of the spring shackles through which passes a spring bolt 2 having a bore 3 and one or more cross holes 4 leading to the outer or bearing surface of the bolt which is engaged by a bushing carrying the end of the spring. 7 is a reservoir which may be constructed in any suitable manner, within which is carried a wick 5, one end of which is positioned in the oil in the reservoir and the other end is adapted to pass through a clamping member 9 into the bore or passage 3 within the spring bolt. The bolt 2 may have an annular groove 29 in alignment with a bore 30 in the shackle 1 for the purpose of lubricating the lower bearing in the shackle. The bore 30 is closed by a plug 34 at the top, the bottom of the bore 30 terminating at the second pin carried by the shackle. The clamping member 9 has preferably an integral head 10, larger in diameter than the extended portion of the member 9 which is adapted to pass through the wall of the reservoir 7 and to attachably engage the member to which the reservoir is to be fastened. In the matter of a spring bolt, I prefer to thread the end of the member 9 to engage corresponding threads in the head of the bolt. The clamping member 9 is adapted to pass through an opening in the reservoir substantially opposite the opening in which the member 9 is permanently positioned. A cap 8 closes the opening through which the member 9 is passed and through which opening a wrench or other means may be inserted in order to tighten up the clamping member securely in position. In order to insure a tight fitting joint, I prefer to use a suitable gasket 11, either in the position shown in Fig. 1 or as shown in Fig. 2. It will be seen especially from Figures 1, 2, and 3, the combination of a taper thread and compressible gasket is such that a very secure locking means is secured, so that a surface of the magazine is drawn into intimate contact with the supporting member and a union is thus provided which is vastly stronger and thus superior to the ordinary device, which is screw-threaded like a nipple into the support member for in such devices the magazine is carried on the end of the nipple, away from the support member. When my magazines are securely clamped in the manner set forth, they will stand very rough treatment without dislodging them from position. As a means of inserting the wick 5 into position, I may use an insertion member 6 which may take the form of a relatively stiff wire which is attached in any suitable manner as 20, by a fine wire engaging an eye at the end of the rod 6, at the same time clamping the end of the wick, all as clearly shown in Fig. 1.

In Fig. 3, 12 is a tie-rod yoke carrying a pivot bearing 17 having thrust members 18 and 19 at its opposite ends. The reservoir 7 is attached to a slight projection 21 on the upper arm of the tie-rod by means of the member 9 as previously described. The wick 5 extends through to the pivot pin 13 which preferably has a longitudinal groove 16 to carry the lubricant to the bottom part of the pin. While no bushings have been indicated around the pin, it is to be understood that these may be used if desired. The top part of the pin is preferably covered by a cap 14 held in position by a cap screw 15.

In Fig. 4 the reservoir 7 has an opening adapted to be closed by the outer surface of the bolt head 22. A clamping member or tube 9, in addition to the screw threads on the end, which are usually in the form of pipe threads, has additional machine screw threads adapted to carry a nut 24 which clamps the reservoir 7 against the head 22 of the bolt 2, in the shackle member 1. In order to prevent the tube 9 on the reservoir 7 from rattling loose, I provide locking means, preferably in the form shown in Fig. 6 wherein a flat member 25 is provided. I prefer to use two of these members 25, each of which may be of suitable size, one inside and one outside the reservoir 7, and to fasten these members directly to the side wall of the reservoir, as indicated at 28. After the reservoir has been put in place and the nut 24 drawn up, then the lips 26 on the outside member are bent over the bolt-head 22, while the lips on the inside member are bent downward over the nut 24 to lock the nut 24 and the reservoir 7 in position on the bolt. If desired, one of the members 25 may have a projection 27.

The filler cap may be placed on the side of the reservoir, as indicated at 31, in which case the tube 9 is bent to the position indicated by the dotted line 32, so that the regulating device 23 may be adjusted through the opening when the cap 31 is removed. In this form of reservoir an additional opening 33 is preferably provided for the purpose of assisting in assembling the lubricating means on the bolt.

It will be observed that the attachment means herein described, is concealed within the reservoir itself, and is therefore, not in a position to be readily tampered with; consequently, the installation, while readily made, is of a very permanent character.

It is to be understood that my invention is susceptible to various changes in the details without departing from the spirit of the same and the scope of the appended claims. For example, the construction shown in Figure 7 includes a short heavy coiled spring 35, placed between the head 10 of the clamping member and the wall of the reservoir. In the case of Figs. 1 and 3, or in the case of Fig. 4, the spring 35 would be placed between the nut 24 and the wall of the reservoir. The object of this spring 35 is to take up any wear or compression of the gasket 11, and also to allow temporary rotation of the magazine 7 after it has been filled with lubricant, and the various filler openings have been closed by their respective caps so that a gravity head will feed oil for such time as may be desired, to the bearing in case of emergency. Later, the magazine can be returned to its normal position as shown in the drawing. When the spring 35 is used, there can also be attached to the magazine, a retaining finger 36 or other equivalent means which would engage with locking spots on the member to which the magazine is clamped in order to retain the magazine for the time being in the position desired.

Having thus described my invention what I claim is:

1. In a magazine lubricating means, a member having a surface to be lubricated, another member adapted to aid in the support of the first mentioned member, said first member having a port leading to a bearing surface on the same, said port entrance to the first member being screw threaded and having a tube screwed therein, a lubricant supply reservoir constructed separately from said support member and adapted to fit over said tube and against the head of said first mentioned member, means on the tube for clamping the reservoir securely against the end of said first mentioned member, and a wick in the reservoir extending into the tube for feeding lubricant to said port.

2. In a magazine lubricating means, a member having a surface to be lubricated, another member adapted to aid in the support of the first mentioned member, said first member having a port leading to a bearing surface on the same, said port entrance to the first member being screw threaded and having a tube screwed therein, a lubricant supply reservoir constructed separately from said support member and adapted to fit over said tube and against the head of said first mentioned member, turning means on the tube for clamping the reservoir securely against the end of said first mentioned member, means for locking the turning means and reservoir in position on the first mentioned member and a wick in the reservoir extending into the tube for feeding lubricant to said port.

3. In a magazine lubricating means, a member having a surface to be lubricated, another member adapted to aid in the support of the first mentioned member, said first member having a port leading to a bearing surface on the same, said port entrance to the first member being screw threaded and having a tube screwed therein, a lubricant supply reservoir constructed separately from said support member and adapted to fit over said tube and against the head of said first mentioned member, a nut on the tube for clamping the reservoir securely against the end of said first mentioned member, means fastened to the reservoir and adapted to be moved to final position for locking the nut in position and the reservoir to the first mentioned member head and a wick in the reservoir extending into the tube for feeding lubricant to said port.

4. A magazine lubricating means, comprising a lubricant reservoir, a member having a surface to be lubricated, integral means having a part passing through a wall of the reservoir and having a part engaging the inner surface of the wall of the reservoir, said part which engages said inner surface adapted to be operated on for directly fastening said reservoir in intimate union with said member, and means for feeding lubricant from the reservoir through said fastening means to the surface to be lubricated.

5. A magazine lubricating means, comprising a lubricant reservoir, a member having a surface to be lubricated, a threaded integral member having a part passing through a wall of the reservoir and having a headed portion engaging the inner surface of the wall of the reservoir said part which engages said inner surface adapted to be operated on for directly fastening said reservoir in intimate union with said member and a wick for feeding lubricant from the reservoir through said threaded member to the surface to be lubricated.

6. A magazine lubricating means, comprising a lubricant reservoir, a member having a surface to be lubricated, integral removable clamping means having a part passing through a wall of the reservoir and having an enlarged portion engaging the inner surface of said wall said part which engages said inner surface adapted to be operated on for directly clamping the same against said member in intimate union and means for feeding lubricant from the reservoir through said fastening means to the surface to be lubricated.

7. A magazine lubricating means, comprising a lubricant reservoir, having a pair of opposite disposed openings, a member having a surface to be lubricated, a tube passing through one of said openings, and having means for engaging said member so as to draw the reservoir against said member, said means being accessible through the other of said openings, means for closing said other opening, means co-operating between an exterior surface of the reservoir and said member to insure a close union at these surfaces, and a wick in the reservoir passing through said tube for feeding lubricant to said surface.

8. A magazine lubricating means, comprising a lubricant reservoir, a member having a surface to be lubricated, means passing through a wall of the reservoir for fastening said reservoir in intimate union against said member, means for feeding lubricant from the reservoir through said fastening means to the surface to be lubricated, and a gasket engaging at least one surface of the wall of the reservoir for insuring said intimate union and preventing lubricant from escaping at the point of fastening.

9. A magazine lubricating means, comprising a lubricant reservoir, a member having a surface to be lubricated, a clamping member having an enlarged end engaging the reservoir on its interior wall and a portion smaller in diameter extending through the wall of the reservoir and attachably engaging said member having the surface to be lubricated so as to complete an intimate union between the reservoir and said member, a wick within the reservoir extending through said clamping member and a gasket in combination with said reservoir for insuring said intimate union and to prevent waste of lubricant.

10. A magazine lubricating means, comprising a lubricant reservoir, a member having a surface to be lubricated, a clamping member having means for engaging the interior wall of the reservoir, said member extending through the wall of the reservoir, and attachably engaging a supporting member having a passage extending to a surface to be lubricated so as to complete an intimate union between the reservoir and said member and a wick for feeding lubricant from the reservoir through said clamping member to the passage and surface to be lubricated.

11. A magazine lubricating means, comprising a lubricant reservoir, a member having a surface to be lubricated, said reservoir having a part adapted to be drawn against said member, a removable clamping means passing through a wall of the reservoir and engaging said member for drawing the reservoir against said member, a compressible member between said member and the part of the reservoir mentioned and a wick for feeding a fluid lubricant from the reservoir through said clamping means to the surface to be lubricated.

12. A magazine lubricating means, comprising a lubricant reservoir, a member having a surface to be lubricated, a single internal means passing through a wall of the reservoir for concealably fastening said reservoir to said member and means for feeding lubricant from the reservoir to the surface to be lubricated, said fastening means being operable from the interior of the reservoir.

13. A magazine lubricating means, comprising a lubricant reservoir, a member having a surface to be lubricated, means passing through a wall of the reservoir for fastening said reservoir to said member, an automatic slack take up member positioned between the wall of the reservoir and the engaging part of said fastening means, and means for feeding lubricant from the reservoir through said fastening means to the surface to be lubricated.

14. A magazine lubricating means, comprising a lubricant reservoir, a member having a surface to be lubricated, means passing through a wall of the reservoir for fastening said reservoir to said member, a spring positioned between the wall of the reservoir and the engaging part of said fastening means, a gasket between the reservoir and the member to which it is attached, a positioning member acting between the reservoir and the last mentioned member and a wick for feeding lubricant from the reservoir through said fastening means to the surface to be lubricated.

15. A magazine lubricating means, comprising a lubricant reservoir, a member having a surface to be lubricated, means passing through a wall of the reservoir for fastening said reservoir to said member and having a head at one end thereof, an automatic slack take up member positioned between the wall of the reservoir and the head of said fastening means, and means for feeding lubricant from the reservoir through said fastening means to the surface to be lubricated.

In testimony whereof, I affix my signature.

CORNELIUS T. MYERS.